J. W. ELLIOTT & N. E. McQUITTY.
ROTARY HARROW.
APPLICATION FILED JAN. 7, 1911.
1,000,387.
Patented Aug. 15, 1911.
2 SHEETS—SHEET 2.
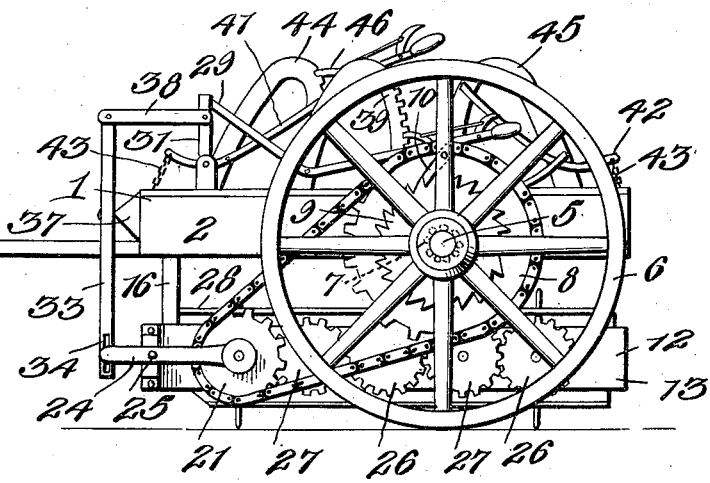
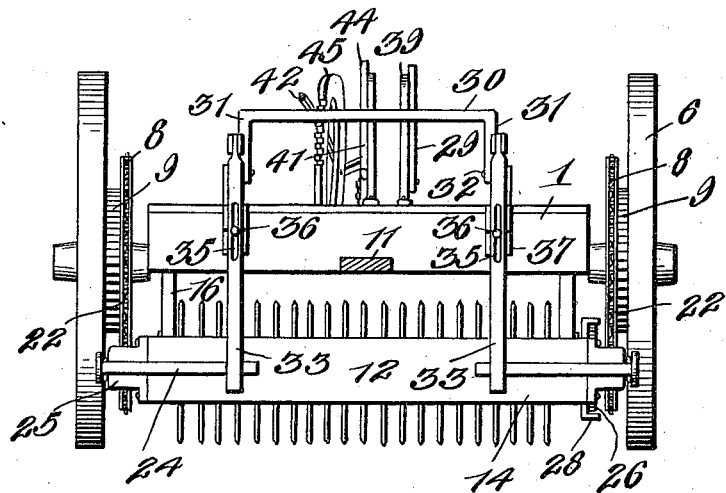

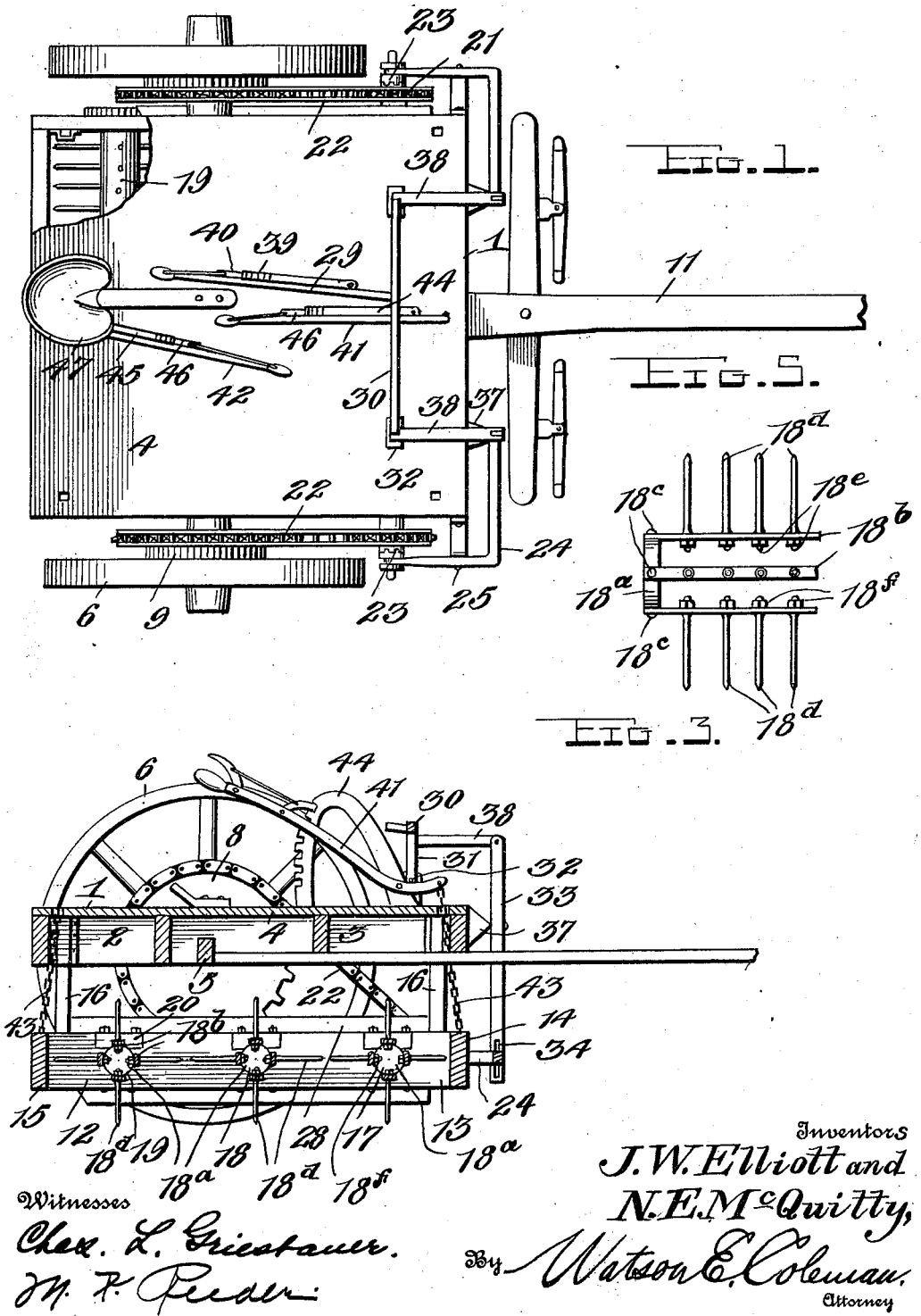

UNITED STATES PATENT OFFICE.

JAMES W. ELLIOTT AND NOAH E. McQUITTY, OF DANVILLE, ILLINOIS.

ROTARY HARROW.

1,000,387. Specification of Letters Patent. Patented Aug. 15, 1911.

Application filed January 7, 1911. Serial No. 601,294.

*To all whom it may concern:*

Be it known that we, JAMES W. ELLIOTT and NOAH E. McQUITTY, citizens of the United States, residing at Danville, in the county of Vermilion and State of Illinois, have invented certain new and useful Improvements in Rotary Harrows, of which the following is a specification, reference being had to the accompanying drawings.

This invention is an improved rotary harrow in which a vertically adjustable harrow frame is provided with revoluble harrow cylinders and means to operate the harrow cylinders, the invention consisting in the construction, combination and arrangement of devices hereinafter described and claimed.

In the accompanying drawings—Figure 1 is a plan of a rotary or cylinder harrow constructed in accordance with our invention, a portion of the covering of the main frame being removed to disclose one of the harrow cylinders. Fig. 2 is a side elevation of the same. Fig. 3 is a vertical longitudinal sectional view of the same. Fig. 4 is a front elevation of the same. Fig. 5 is a detail sectional view of one of the harrow cylinders.

The main frame 1 of our improved harrow comprises a pair of side bars 2, a number of cross bars 3, and a cover or flooring 4 on the upper side of the said frame. An axle 5 is secured at suitable points to the side bars 2 and on its spindles are mounted a pair of ground wheels 6, ball bearings indicated at 7 being provided for the said ground wheels. Each ground wheel is provided on its inner side with a driving gear 8 which is mounted for revolution therewith, and also for rotation independently thereof, each driving gear being provided with ratchet teeth 9 at one side and each ground wheel being provided with a spring pressed pawl 10 for engagement with said ratchet tooth so as to lock the wheel 8 to the ground wheel under ordinary conditions and yet permit the driving gear wheel 8 to slip when the machine is turning at the end of a row or is being backed. The driving gears 8 may be driven either from the wheels or from the axle, and if desired only one of the said driving gears need be employed. The gears 8 are also provided with peripheral sprocket teeth as shown.

A draft pole 11 extends from the front side of the main frame, its rear portion being preferably secured to some of the cross bars 3, and also to the axle. Suitable devices such as double-trees and swingle-trees are connected to the draft pole so that any desired number of horses may be harnessed to the machine. The harrow frame 12 which is located below the main frame is rectangular in form and comprises a pair of side bars 13, and also front and rear connecting bars 14, 15. At the corners of the said harrow frame are upwardly extending standards 16 which operate in vertical guide openings with which the side bars 2 of the main frame 1 are provided so that the said harrow frame is connected to the main frame and is also adapted to be raised and lowered. A series of revoluble harrow cylinders 17, 18 and 19 have their spindles mounted in blocks 20 which are detachably secured to the side beams 13 of the harrow frame, the said blocks being provided with roller bearings for the said spindles of the said harrow cylinders. Each harrow cylinder comprises a pair of circular heads $18^a$, and bars $18^b$, which connect the circular heads together, and are bolted thereto by means of bolts $18^c$, so that any one of the bars may be removed if desired. The harrow teeth $18^b$ or knives or other earth working implements are provided at their inner ends with threaded stems $18^e$, which extend through openings in the bars, and to which are screwed nuts $18^f$, which admit of the removal of the harrow teeth or implements from the bars in the event any of them should become broken and it be desired to substitute new ones therefor.

The spindles of the front harrow cylinder 17, extend outwardly beyond the sides of the harrow frame, and are each provided with a sprocket wheel 21, loose thereon and connected to one of the driving sprocket gears 8, by an endless sprocket chain 22, and the said extended spindles of said harrow cylinder are also provided with clutches 23 which are splined thereon and are movable into and out of engagement with said sprocket wheel 21, to lock the said sprocket wheels with the spindles of the said cylinder, or release the same so that they may rotate idly on said spindles as may be required. Bell cranks 24 are mounted as at 25 at the front corners of the harrow frame and have their rearwardly extending arms connected to the clutches to operate the latter, the front inwardly extending arms of the said bell cranks being disposed in advance of the harrow frame. Each of the harrow cylinders is provided at one end at one side of the harrow frame with a spur gear 26, and idler gears 27 are mounted on the same side of the harrow frame and engage the said spur gears, so that when the front harrow cylinder is driven by the sprocket wheels, and sprocket chains hereinbefore described, and the ground wheels, all of the said harrow cylinders will be rotated together in the same direction, and at the same rate of speed. Shoes 28 at the lower sides of the side bars of the harrow frame extend outwardly therefrom, and serve to protect the sprocket wheels 21, and the gear which connect the harrow cylinders together.

A lever 29 is provided with a fork 30, the arms 31 of which are pivotally mounted as at 32 on the upper side of the main frame. Link levers 33 are provided near their lower ends with slots 34 which are engaged by the front arms of the bell cranks, and the said link levers are also provided at points intermediate their ends with slots 35 which are engaged by pivotal bolts 36 which project forwardly from blocks 37, secured on the front side of the main frame. The upper ends of the said link levers are connected to the arms 31 of the fork of the lever 29 by means of rods 38, the front ends of the said rods being pivotally connected to the arms of the fork. The lever 29 operates on one side of a locking segment 39, and is provided with a locking dog 40 for engagement with said locking segment so that the said lever may be secured at any desired adjusted position. When said lever 29 is raised, the arms 31 of its fork move forwardly and serve in connection with the rods 38 to move the upper ends of the link levers forwardly and hence cause the lower ends of the link levers to move rearwardly, said link levers by reason of their connection with the front arms of the bell cranks turning the said bell cranks in the required direction to cause them to move the clutches out of engagement with the sprocket wheels 21 and hence throw the harrow cylinders out of gear. When the lever 29 is moved downwardly, its action is reversed and the clutches are caused to engage the said sprocket wheels 21 so as to throw the harrow cylinders in gear, and cause them to be rotated by the connections hereinbefore described. Owing to the provision of the slots in the link levers which are engaged by the pivots of said link levers and the front arms of the bell cranks, the said link levers remain connected with the bell cranks under all conditions whether the harrow frame be raised or lowered.

To raise and lower the harrow frame as may be required we provide a pair of levers 41, 42 which are respectively connected as by means of chains 43, to the front and rear sides of the harrow frame. The said levers are fulcrumed as at 44 on the upper side of the main frame, and respectively coact with locking segments 44, 45, and are each provided with a locking dog 46, said locking dogs and locking segments enabling the said levers to be secured at any desired adjustment, the said levers and the connections between the same and the harrow frame enabling the harrow frame to be raised and lowered at either or both ends as may be required. Hence the harrows may be caused to operate at any desired depth in the soil, and may be raised entirely above the ground when the machine is being driven from one point to another. If it be desired that the harrow cylinder shall operate to unequal depths in the soil, this may be accomplished by slightly tilting or inclining the harrow frame by means of its levers and connections as will be understood. A seat for the driver is indicated at 47 on the rear portion of the main frame, within convenient reach of all of the levers so that the operator without moving from the seat can control all of the levers as may be required, while driving the team.

The machine may be made of any desired size, and changes may be made in the form, construction and proportion of the various parts within the scope of our invention.

We claim:—

1. In a harrow of the class described, the combination of a main frame, ground wheels therefor, sprocket wheels revolved by said ground wheels, a harrow frame under the main frame, connections between the main frame and the harrow frame, and adapting the harrow frame to be raised and lowered, means to raise and lower the harrow frame, a harrow cylinder mounted for revolution and carried by the harrow frame, said harrow cylinder having axle spindles, sprocket wheels on said axle spindle, sprocket chains connecting said sprocket wheels to the first mentioned sprocket wheels, clutches on said axle spindles to lock the sprocket wheels which are carried by said axle spindles to said axle spindles or release the same therefrom, bell cranks mounted on the harrow frame and having rearwardly extending arms engaging said clutches, and inwardly extending arms disposed in front of said harrow frame, link levers mounted on the main frame and to which the front arms of said bell cranks are connected for vertical sliding movement, and means to operate said link levers.

2. In a harrow of the class described, the combination of a main frame, ground wheels therefor, sprocket wheels revolved by said ground wheels, a harrow frame under the main frame, connections between the main frame and the harrow frame, and adapting the harrow frame to be raised and lowered, means to raise and lower the harrow frame, a harrow cylinder mounted for revolution and carried by the harrow frame, said harrow cylinder having axle spindles, sprocket wheels on said axle spindles, sprocket chains connecting said sprocket wheels to the first mentioned sprocket wheels, clutches on said axle spindles to lock the sprocket wheels which are carried by said axle spindles to said axle spindles or release the same therefrom, bell cranks mounted on the harrow frame and having rearwardly extending arms engaging said clutches, and inwardly extending arms disposed in front of said harrow frame, link levers mounted on the main frame and to which the said front arms of said bell cranks are connected for vertical sliding movement, and a lever having a fork the arms of which are mounted on said main frame, and rods connecting said fork arms to the upper ends of said link levers.

In testimony whereof we hereunto affix our signatures in the presence of two witnesses.

JAMES W. ELLIOTT.
NOAH E. McQUITTY.

Witnesses:
M. S. JOHNSON,
JAMES MUIRHEAD.

---

Copies of this patent may be obtained for five cents each, by addressing the "Commissioner of Patents, Washington, D. C."